United States Patent [19]

Chen

[11] Patent Number: 5,507,566
[45] Date of Patent: Apr. 16, 1996

[54] COUPLING DEVICE FOR COUPLING A WHEEL TO A GOLF TROLLEY

[75] Inventor: Jau-Cheng Chen, Tainan, Taiwan

[73] Assignee: Trust Land Enterprise Co., Ltd., Taiwan

[21] Appl. No.: 226,042

[22] Filed: Apr. 11, 1994

[51] Int. Cl.$^6$ .................................................. B60B 35/00
[52] U.S. Cl. .......................... 301/111; 301/121; 403/325
[58] Field of Search .................................. 301/105.1, 111, 301/112, 118, 119, 120, 121, 122, 126, 131; 280/642, 645, 646, 647, 652, 654, DIG. 4, DIG. 6; 403/321, 324, 325

[56] References Cited

U.S. PATENT DOCUMENTS

| 942,780 | 12/1909 | Iversen | 403/324 |
|---|---|---|---|
| 1,354,114 | 9/1920 | Lindberg | 301/120 |
| 4,392,690 | 7/1983 | Anderson | 301/124.2 X |
| 5,029,946 | 7/1991 | Liao | 301/111 |
| 5,096,236 | 3/1992 | Thony | 403/324 X |

FOREIGN PATENT DOCUMENTS

| 708094 | 4/1965 | Canada | 301/121 |
|---|---|---|---|
| 1371442 | 8/1963 | France | 301/121 |

Primary Examiner—Russell D. Stormer
Attorney, Agent, or Firm—Finnegan, Henderson, Farabow, Garrett & Dunner

[57] ABSTRACT

A coupling device for coupling a wheel to a wheel strut of a golf trolley includes a wheel mounting bracket, a catch member, a compression spring and an axle member. The wheel mounting bracket is adapted to be mounted on one end of the wheel strut and has a slide channel with a restricted open end portion and a closed end opposite to the open end portion, and a tubular connecting portion which confines an insert hole that is transverse to and communicated with an interior of the slide channel. The catch member includes a block unit which extends slidably into the slide channel via the open end portion and which has a side wall formed with a tab to prevent removal of the block unit via the open end portion of the slide channel, and a hook unit which extends from the block unit and into the slide channel toward the insert hole of the connecting portion. The compression spring is disposed inside the slide channel and biases the block unit outwardly of the slide channel. The axle member is adapted to be mounted rotatably on a hub of the wheel, and has a head portion which extends removably into the insert hole of the connecting portion and which is formed with a peripheral hook engaging groove for engaging the hook unit of the catch member.

7 Claims, 6 Drawing Sheets

COUPLING DEVICE FOR COUPLING A WHEEL TO A GOLF TROLLEY

BACKGROUND OF THE INVENTION

1. Field of the Invention

The invention relates to a coupling device for coupling a wheel to a golf trolley, more particularly to a coupling device which facilitates assembly and disassembly of a wheel to and from a wheel strut of a golf trolley.

2. Description of the Related Art

Referring to FIG. 1, a conventional golf trolley is shown to comprise an elongated chassis member 11, a seating 12 mounted on a lower end of the chassis member 11 and used to support a lower end of a golf bag (not shown) thereon, and a handle member 14 with a top end formed with a grip portion 15 and a lower end connected to an upper end of the chassis member 11 by means of a handle mounting bracket 13. A connecting plate 16 is secured to an intermediate portion of the chassis member 11. The golf trolley further comprises two wheel strut units 170, each of which having a first end secured to the connecting plate 16 and an opposite second end secured to a wheel mounting bracket 17. Each of a pair of wheels 18 has a rotatable axle 19 mounted on a respective one of the wheel mounting brackets 17.

FIG. 2 illustrates how the wheel 18 is mounted rotatably on the respective wheel mounting bracket 17. A connecting tube 172 is welded on a rear surface of the wheel mounting bracket 17. A nut 173 is welded on an outer surface of the connecting tube 172 and confines a threaded hole 174 which is communicated with the interior 175 of the connecting tube 172. The axle 19 of the wheel 18 is formed with a radial through-hole 191.

During assembly, the axle 19 extends into the interior 175 of the connecting tube 172 such that the radial through-hole 191 is aligned with the threaded hole 174 of the nut 173. The threaded shank 178 of a rotary knob 176 engages threadedly the nut 173 and extends into the radial through-hole 191, thereby securing the wheel 18 onto the wheel mounting bracket 17. In order to minimize undesired rotation of the rotary knob 176 after assembly, a spring 177 is provided between the head portion 179 of the rotary knob 176 and the outer surface of the connecting tube 172.

It is noted that the wheel mounting bracket 17 is inconvenient to manufacture because of the need to weld the connecting tube 172 and the nut 173 thereon. Furthermore, it is difficult to align the radial through-hole 191 of the axle 19 with the threaded hole 174 of the nut 173 during assembly. In addition, the spring 177 is easily misplaced when the wheel 18 is detached from the wheel mounting bracket 17.

SUMMARY OF THE INVENTION

Therefore, the objective of the present invention is to provide a coupling device which facilitates assembly and disassembly of a wheel to and from a wheel strut of a golf trolley and which can overcome the drawbacks that are associated with the above described prior art.

Accordingly, the coupling device of the present invention is used to couple a wheel to a wheel strut of a golf trolley and comprises:

a wheel mounting bracket adapted to be mounted on one end of the wheel strut, the wheel mounting bracket having a slide channel with a restricted open end portion and a closed end opposite to the open end portion, and a tubular connecting portion which confines an insert hole that is transverse to and communicated with an interior of the slide channel;

a catch member including a block unit which extends slidably into the slide channel via the open end portion, the block unit having a side wall formed with a tab to prevent removal of the block unit via the open end portion of the slide channel, the catch member further having a hook unit extending from the block unit and into the slide channel toward the insert hole of the connecting portion;

a compression spring disposed inside the slide channel and biasing the block unit outwardly of the slide channel; and an axle member adapted to be mounted rotatably on a hub of the wheel, the axle member having a head portion extending removably into the insert hole of the connecting portion, the head portion being formed with a peripheral hook engaging means for engaging the hook unit of the catch member.

The hook unit of the catch member disengages the hook engaging means of the head portion of the axle member to permit removal of the axle member from the wheel mounting bracket when the catch member is pushed to move inwardly of the slide channel.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
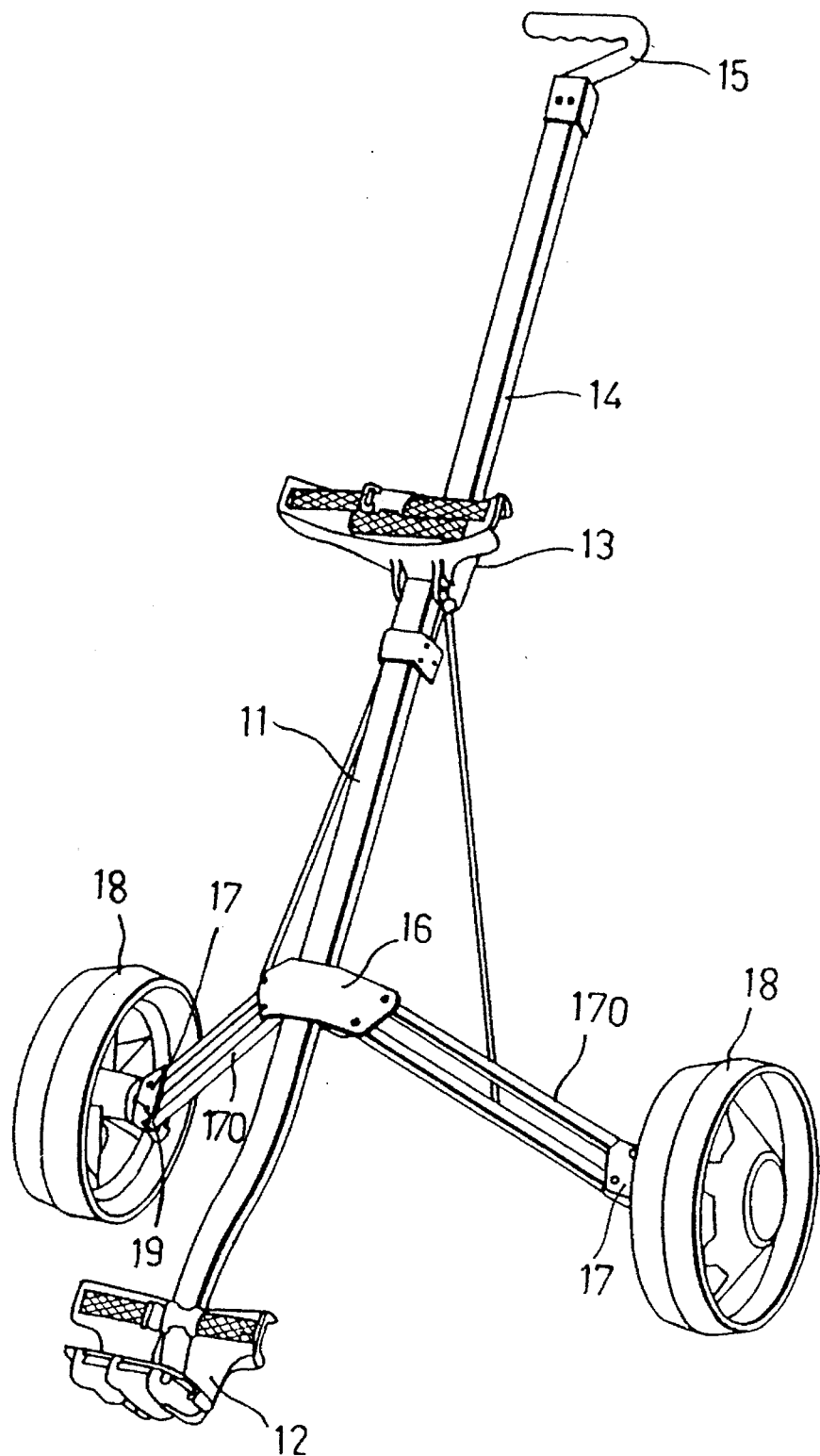
FIG. 1 is a perspective view of a conventional golf trolley.
Figure 2:
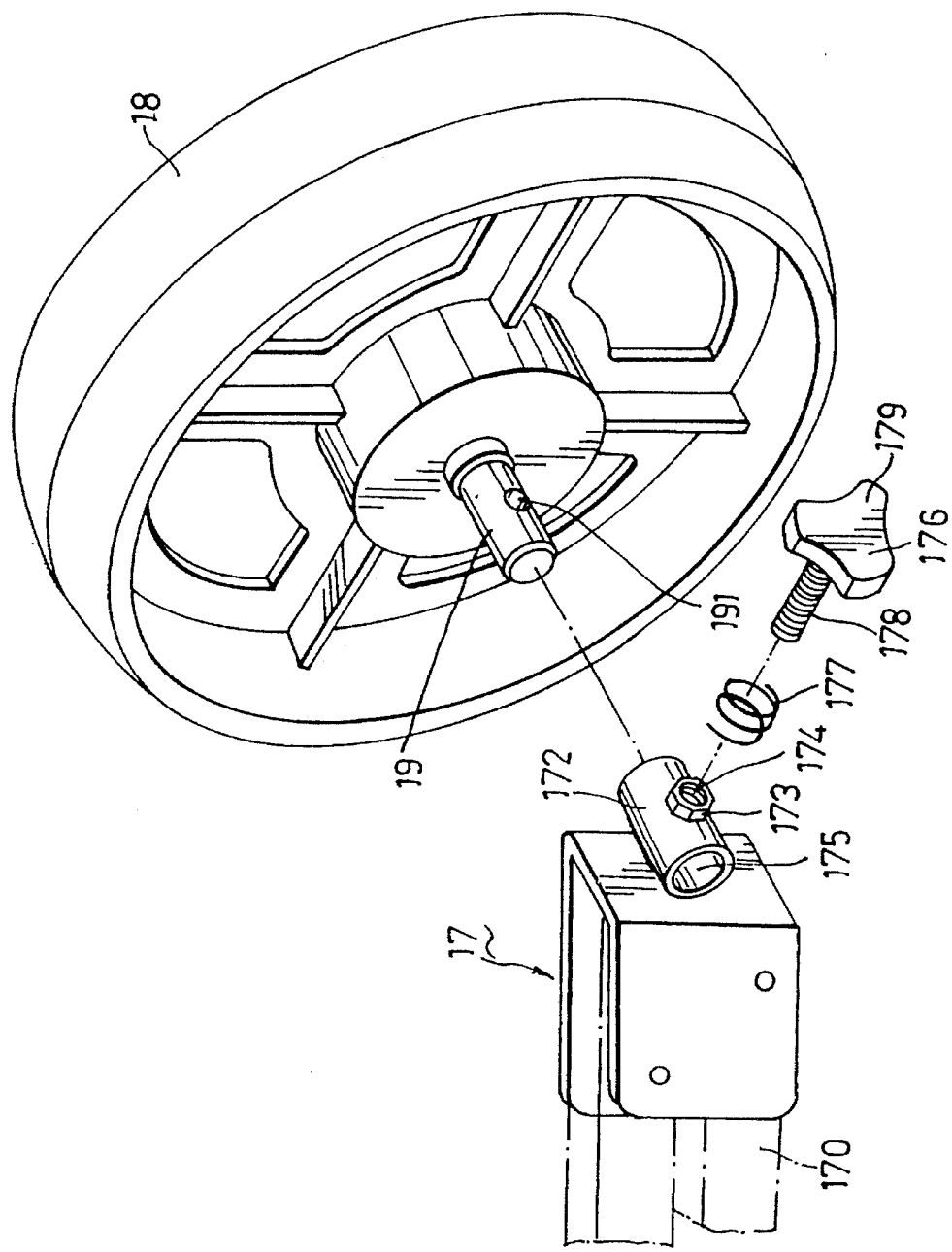
FIG. 2 is an exploded view of a conventional coupling device for coupling a wheel to a wheel strut of a golf trolley.
Figure 3:
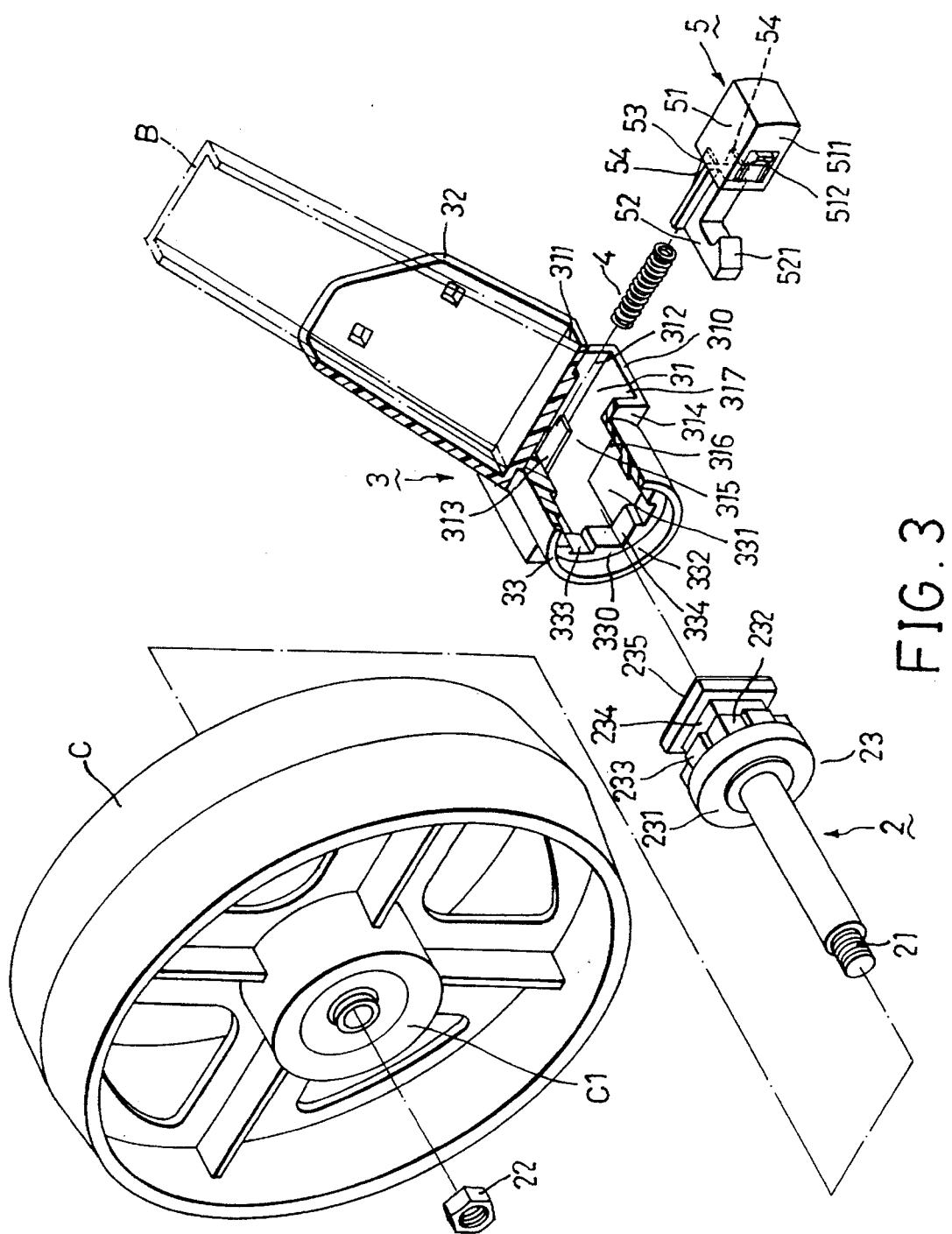
FIG. 3 is an exploded view of the preferred embodiment of a coupling device according to the present invention.
Figure 4:
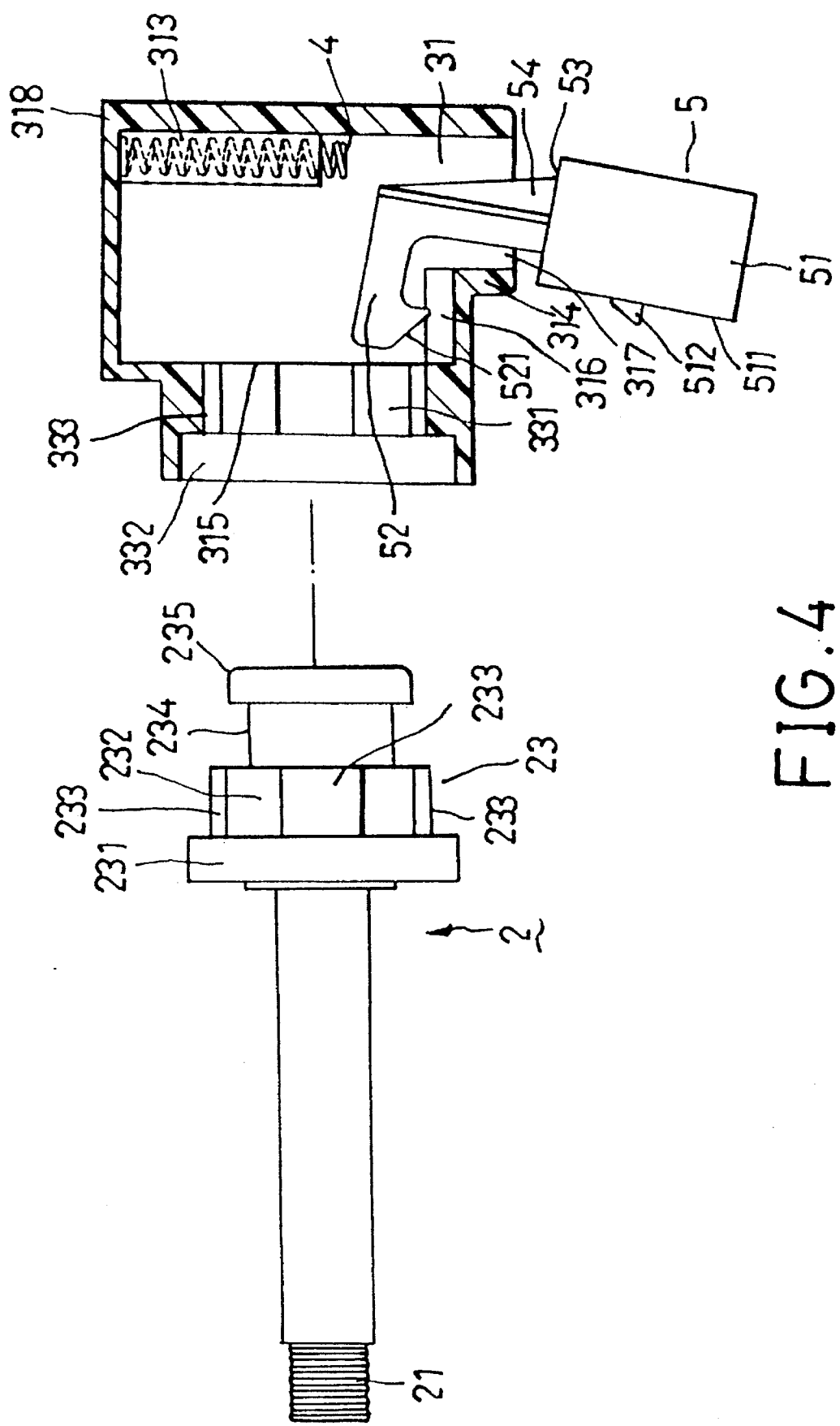
FIG. 4 is a partly sectional view illustrating how the preferred embodiment is assembled.

Referring to FIGS. 3 and 4, the preferred embodiment of a coupling device according to the present invention is used to couple a wheel (C) to a wheel strut (B) of a golf trolley and is shown to comprise an axle member 2, a wheel mounting bracket 3, a coiled compression spring 4, and a catch member 5.

The wheel mounting bracket 3 is a hollow plastic body which is formed with a slide channel 31 that is rectangular in cross section, and a wheel strut receiving member 32 that extends upwardly and inclinedly from a top wall 311 of the slide channel 31. The receiving member 32 receives one end of the wheel strut (B) and is mounted fixedly thereto. The slide channel 31 has a rear side wall 312 formed with a spring positioning unit. In this embodiment, the spring positioning unit includes a pair of parallel positioning plates 313 (only one is shown) spaced respectively from top and bottom walls 311, 310 of the slide channel 31. The slide channel 31 further has a front side wall 314 formed with an access opening 315 to access the interior of the slide channel 31. The wheel mounting bracket 3 further has a tubular connecting portion 33 which extends from the front side wall 314 of the slide channel 31. The connecting portion 33 confines an insert hole 331 which is transverse to the interior of the slide channel 31 and has an intermediate section formed with a radial inward flange 330, thereby forming a positioning recess 332 on a front end of the connecting portion 33. The insert hole 331 is communicated with the interior of the slide channel 31 via the access opening 315. The flange 330 confines a rectangular opening 334 which communicates the positioning recess 332 and the insert hole 331 and is formed with four peripheral notches 333. The connecting portion 33 further has an inner surface that is formed with a notch 316 adjacent to a restricted open end portion 317 of the slide channel 31.

The compression spring 4 is disposed between the positioning plates 313 and has one end which abuts against a closed end 318 of the slide channel 31.

The catch member 5 includes a block unit 51 which extends slidably into the slide channel 31 via the open end portion 317 of the latter. The block unit 51 has a side wall 511 formed with a resilient tab 512 to prevent removal of the block unit 51 via the open end portion 317 of the slide channel 31. In this embodiment, the block unit 51 has an end face 53 that is formed with a generally L-shaped hook unit 52. The other end of the compression spring 4 abuts against the end face 53 of the block unit 51 to bias the block unit 51 outwardly of the slide channel 31. The hook unit 52 has a distal end formed with an inclined face 521. A pair of guide plates 54 extend from one side of the hook unit 52 and are spaced apart by a distance greater than the width of the compression spring 4.

The axle member 2 passes rotatably through a hub (C1) of the wheel (C). The axle member 2 has one end 21 which is threaded and which engages a nut 22, and a head portion 23 formed on the other end so that separation of the wheel (C) from the axle member 2 can be prevented. The head portion 23 is formed with a positioning ring 231 to be fitted removably in the positioning recess 332 of the connecting portion 33 of the wheel mounting bracket 3, a positioning block 232 which extends axially from the positioning ring 231 and which has a shape that conforms with the rectangular opening 334 of the flange 330 of the connecting portion 33, four positioning projections 233 on the periphery of the positioning block 232 and to be received in the notches 333 of the flange 330, and a retaining block 235 which extends axially from the positioning block 232 and which is formed with a peripheral hook engaging unit for engaging the hook unit 52 of the catch member 5. The positioning projections 233 serve to strengthen the connection between the flange 330 and the head portion 23 of the axle member 2. In this embodiment, the hook engaging unit is formed as a peripheral groove 234 in the retaining block 235 and is disposed adjacent to the positioning block 232.

Figure 5:
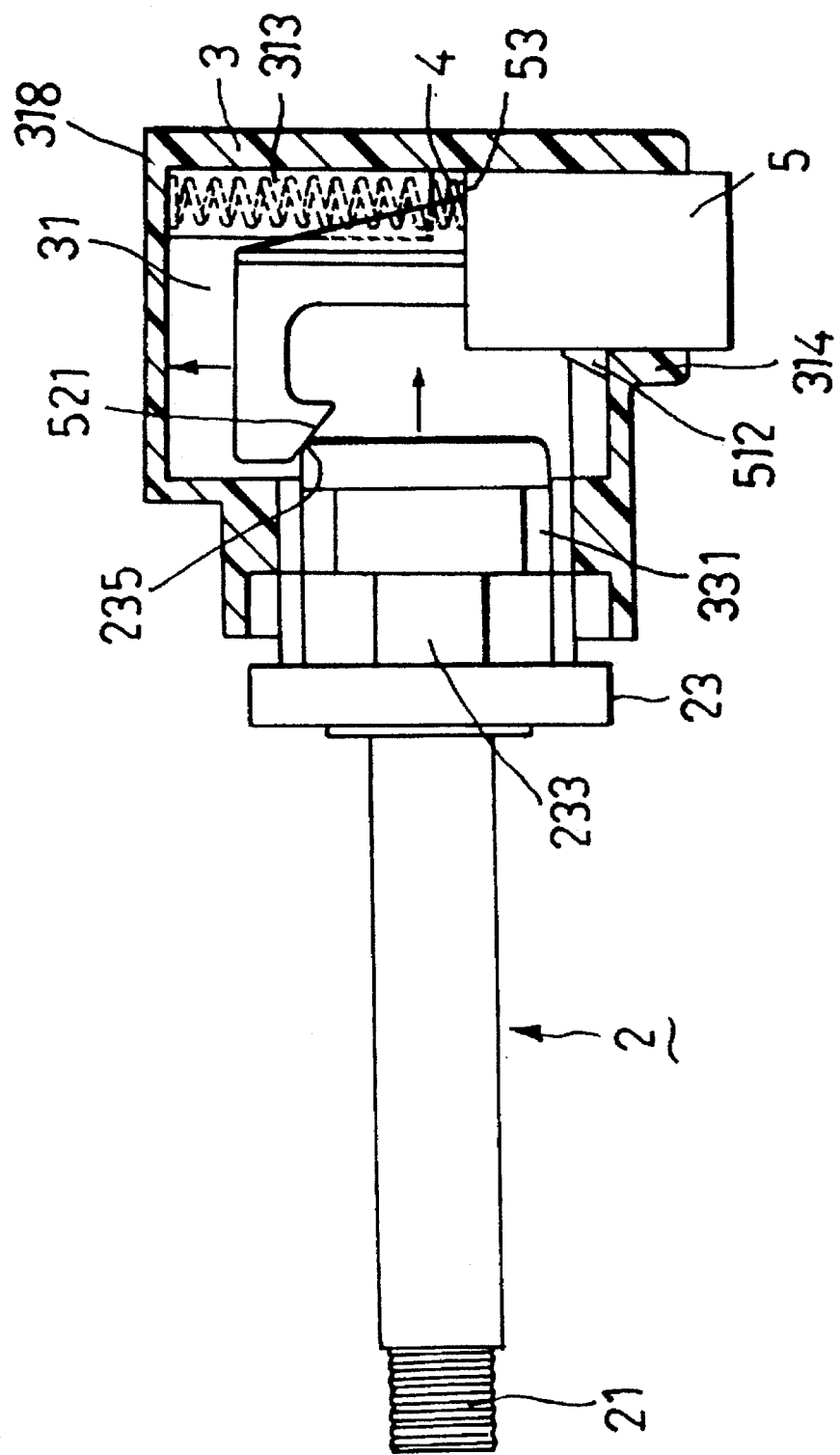
FIG. 5 is a partly sectional view illustrating how the preferred embodiment operates.

Assembly of the preferred embodiment is as follows: Referring to FIGS. 3 to 5, after the compression spring 4 has been disposed in the slide channel 31 between the positioning plates 313, the catch member 5 is inserted into the slide channel 31 via the open end portion 317 of the latter. Since the hook unit 52 of the catch member 5 is wider than the block unit 51, the catch member 5 must be inserted in an inclined position in order to permit the wide end of the hook unit 52 to move past the open end portion 317 of the slide channel 31. The resilient tab 512 of the block unit 51 eventually extends into the notch 316 to prevent removal of the catch member 5 from the wheel mounting bracket 3. Aside from retaining the tab 512 therein, the notch 316 further serves to facilitate proper engagement between the catch member 5 and the wheel mounting bracket 3 when the connecting portion 33 is disposed very close to the open end portion 317 of the slide channel 31. The guide plates 54 are disposed on opposite sides of the positioning plates 313, and the compression spring 4 abuts the end face 53 of the block unit 51 at this stage. The axle member 2 passes rotatably through the hub (C1) of the wheel (C) and is secured to the same by virtue of the engagement between the nut 22 and the threaded end 21 of the axle member 2. The head portion 23 of the axle member 2 is then inserted into the connecting portion 33 of the wheel mounting bracket 3.

Figure 6:
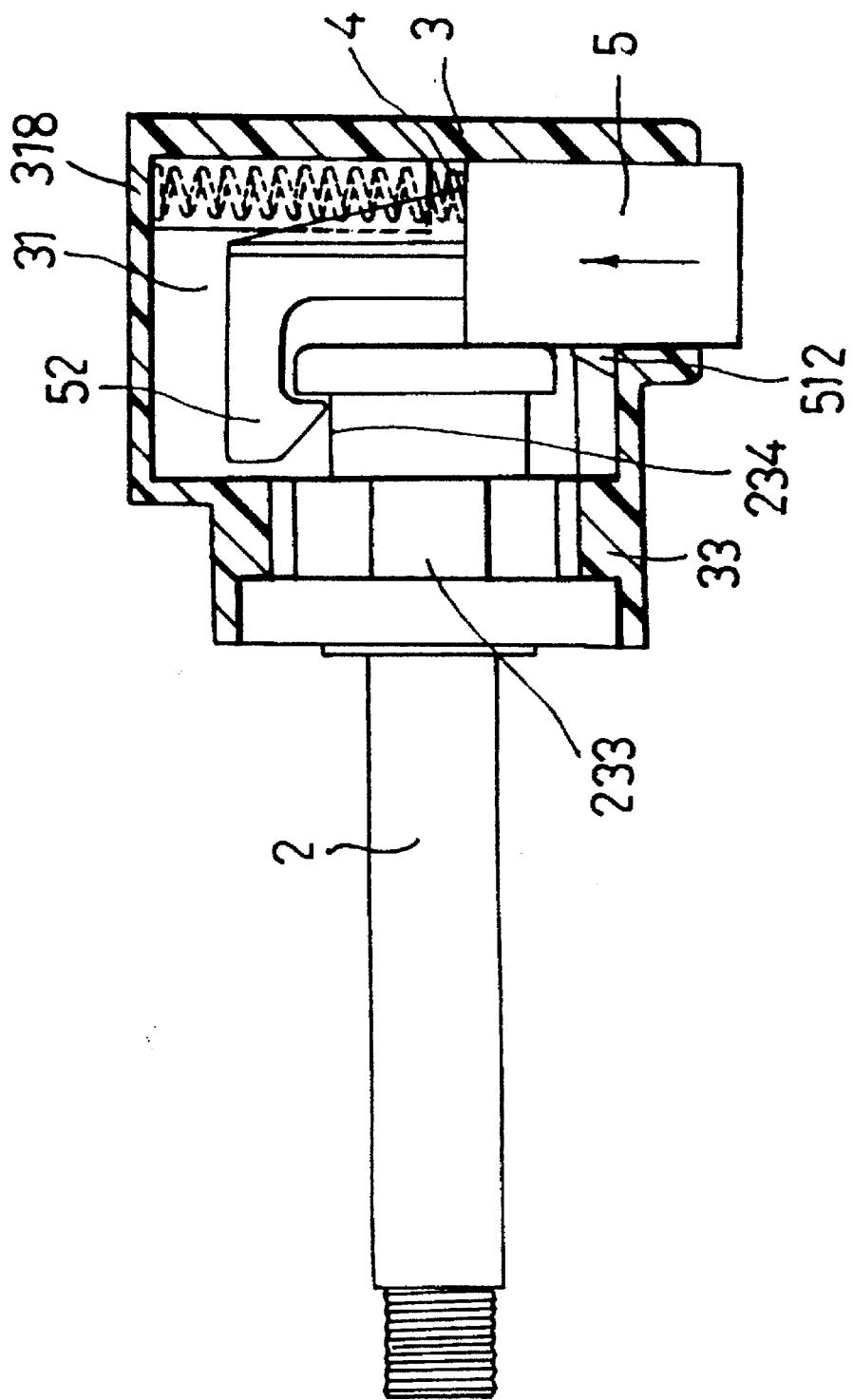
FIG. 6 illustrates the preferred embodiment when in a locked state.

Referring to FIGS. 5 and 6, when the head portion 23 of the axle member 2 is inserted further into the connecting portion 33 of the wheel mounting bracket 3, the retaining block 235 at the head portion 23 eventually abuts the inclined face 521 at the distal end of the hook unit 52. Further movement of the head portion 23 in this direction causes the catch member 5 to move further into the slide channel 31, thereby compressing the compression spring 4. The distal end of the hook unit 52 extends into the peripheral groove 234 in the retaining block 235 due to the return force of the compression spring 4 when the latter becomes aligned with the former, thereby resulting in engagement between the catch member 5 and the axle member 2. In short, when installing the wheel (C), the head portion 23 of the axle member 2 is simply forced into the connecting portion 33 of the wheel mounting bracket 3 to engage automatically the catch member 5 and the axle member 2, thus facilitating coupling of the wheel (C) on the wheel strut (B) of the golf trolley. When it is desired to disassemble the wheel (C), the catch member 5 is pressed to move inwardly of the slide channel 31, thereby moving the distal end of the hook unit 52 away from the peripheral groove 234 of the retaining block 235. The axle member 2 can be pulled out of the connecting portion 33 of the wheel mounting bracket 3 at this stage.

Note that the positioning plates 313 in the slide channel 31 not only serve to position the compression spring 4, but also serve to limit the movable range of the catch member 5 inside the slide channel 31. In this embodiment, further inward movement of the catch member 5 in the slide channel 31 is prevented when the tips of the positioning plates 313 abut the end face 53 of the block unit 51. The distal end of the hook unit 52 has disengaged the peripheral groove 234 in the retaining block 235 at this stage. Alternatively, further inward movement of the catch member 5 in the slide channel 31 can also be prevented when the hook unit 52 abuts the closed end 318 of the slide channel 31.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A coupling device for coupling a wheel to a wheel strut of a golf trolley, comprising:

a wheel mounting bracket adapted to be mounted on one end of the wheel strut, said wheel mounting bracket having a slide channel with a restricted open end portion and a closed end opposite to said open end portion, and a tubular connecting portion which confines an insert hole that is transverse to and communicates with an interior of said slide channel;

a catch member including a block unit which extends slidably into said slide channel via said open end portion, said block unit having a side wall formed with a tab to prevent removal of said block unit via said open end portion of said slide channel, said catch member further having a hook unit extending from said block unit and into said slide channel toward said insert hole of said connecting portion;

a compression spring disposed inside said slide channel and biasing said block unit outwardly of said slide channel; and an axle member adapted to be mounted rotatably on a hub of the wheel, said axle member having a head portion extending removably into said insert hole of said connecting portion, said head portion being formed with a peripheral hook engaging means for engaging said hook unit of said catch member;

wherein said hook unit has a distal end formed with an inclined face to permit movement of said catch member inwardly of said slide channel when said axle member is forced into said connecting portion of said wheel mounting bracket so as to permit automatic engagement between said distal end of said hook unit and said hook engaging means of said head portion of said axle member;

whereby, said hook unit of said catch member can be disengaged from said hook engaging means of said head portion of said axle member to permit removal of said axle member from said wheel mounting bracket when said catch member is pushed to move inwardly of said slide channel.

2. The coupling device as claimed in claim 1, wherein said connecting portion of said wheel mounting bracket is formed with a radial inward flange that confines a rectangular opening to access said insert hole, said head portion of said axle member being formed with a positioning block which has a shape that conforms with said rectangular opening, and a retaining block which extends axially from said positioning block, said hook engaging means being formed on said retaining block.

3. The coupling device as claimed in claim 2, wherein said hook engaging means comprises a peripheral groove formed in said retaining block.

4. The coupling device as claimed in claim 2, wherein said flange is formed with a plurality of peripheral notches, and said positioning block is formed with a plurality of positioning projections which extend into said peripheral notches when said axle member is inserted into said connecting portion of said wheel mounting bracket.

5. The coupling device as claimed in claim 2, wherein said connecting portion of said wheel mounting bracket has a front end and an intermediate section, said flange being disposed in said intermediate section so as to form a positioning recess on said front end of said connecting portion, said head portion being further formed with a positioning ring fitted removably in said positioning recess, said positioning block extending axially from said positioning ring.

6. The coupling device as claimed in claim 1, wherein said slide channel has a side wall opposite to said connecting portion and formed with a spring positioning unit, said spring positioning unit including a pair of parallel positioning plates, said compression spring being disposed between said positioning plates.

7. The coupling device as claimed in claim 1, wherein said slide channel has a front side wall formed with an access opening to access the interior thereof, said connecting portion extending from said front side wall and having an inner surface formed with a notch adjacent to said open end portion of said slide channel and aligned with said tab of said catch member.

* * * * *